US012743115B2

(12) United States Patent
Hay et al.

(10) Patent No.: US 12,743,115 B2
(45) Date of Patent: Sep. 22, 2026

(54) VALVE

(71) Applicant: RELIANCE WORLDWIDE CORPORATION (AUST.) PTY. LTD., Eagle Farm (AU)

(72) Inventors: Gary Hay, Eagle Farm (AU); Greg Harrap, Eagle Farm (AU)

(73) Assignee: Reliance Worldwide Corporation (Aust.) Pty. Ltd., Melbourne (AU)

( * ) Notice: Subject to any disclaimer, the term of this patent is extended or adjusted under 35 U.S.C. 154(b) by 82 days.

(21) Appl. No.: 18/711,162

(22) PCT Filed: Nov. 18, 2022

(86) PCT No.: PCT/AU2022/051383

§ 371 (c)(1),
(2) Date: May 17, 2024

(87) PCT Pub. No.: WO2023/087068

PCT Pub. Date: May 25, 2023

(65) Prior Publication Data

US 2025/0021116 A1 Jan. 16, 2025

(30) Foreign Application Priority Data

Nov. 19, 2021 (AU) ................................ 2021903731

(51) Int. Cl.
*G05D 23/13* (2006.01)

(52) U.S. Cl.
CPC .................................. *G05D 23/134* (2013.01)

(58) Field of Classification Search
CPC ............. G05D 23/134; G05D 23/1346; G05D 23/1353; F16K 27/0263; F16K 31/002; F16K 11/044
See application file for complete search history.

(56) References Cited

U.S. PATENT DOCUMENTS 3,827,016 A * 7/1974 Knapp ............... G05D 23/1346 137/625.37
6,079,625 A * 6/2000 Lebkuchner ....... G05D 23/1346 236/12.2

(Continued)

FOREIGN PATENT DOCUMENTS

CN 205781053 U 12/2016
CN 110030404 A 7/2019

(Continued)

OTHER PUBLICATIONS

Extended Search Report in EP Appln. No. 22894022.7, dated Sep. 15, 2025.

(Continued)

*Primary Examiner* — Nelson J Nieves
(74) *Attorney, Agent, or Firm* — Barnes & Thornburg LLP

(57) ABSTRACT

A valve including a valve body having at least two inlets and an outlet configured to be in fluid communication with the at least two inlets; an adjusting portion associated with the valve body, the adjusting portion providing a stop structure; a piston in fluid communication with the at least two inlets and the outlet; a thermostatic element configured to assist with moving the piston in response to engaging with the stop structure, the piston being configured to regulate fluid flow from the at least two inlets to the outlet; and a return spring configured to assist with biasing the thermostatic element; and a mixing part provides assistance with mixing fluid from the at least two inlets to the outlet, wherein the mixing part is integrally formed with valve body.

15 Claims, 4 Drawing Sheets

(56) References Cited

U.S. PATENT DOCUMENTS

| | | | | |
|---|---|---|---|---|
| 6,250,559 | B1 * | 6/2001 | Knauss | G05D 23/1346 236/12.2 |
| 7,073,725 | B2 * | 7/2006 | Swadling | G05D 23/1353 236/12.2 |
| 12,305,764 | B2 * | 5/2025 | Yang | F16K 1/523 |
| 2021/0055749 | A1 * | 2/2021 | Hay | G05D 23/1346 |
| 2022/0107658 | A1 * | 4/2022 | Pottie | G05D 23/134 |

FOREIGN PATENT DOCUMENTS

| | | | |
|---|---|---|---|
| CN | 210218782 | U | 3/2020 |
| CZ | 124195 | A3 * | 11/1996 |
| DE | 102017129339 | A1 | 6/2019 |
| FR | 92539 | E | 11/1968 |

OTHER PUBLICATIONS

Australian International-Type Search Report; Australian Patent Application No. 2021903731; Dec. 14, 2021.

International Search Report and Written Opinion; International Patent Application No. PCT/AU2022/051383; Dec. 7, 2022.

* cited by examiner

VALVE

FIELD

This disclosure relates to a valve, and, in particular, a thermostatic mixing valve. This disclosure also relates to methods associated with such a valve.

CROSS REFERENCE TO RELATED APPLICATION

This application claims priority to Australian Provisional Application No. 2021903731, filed 19 Nov. 2022, which is herein incorporated by cross-reference in its entirety.

BACKGROUND

Reference to background art herein is not to be construed as an admission that such art constitutes common general knowledge in Australia or elsewhere.

The fundamental purpose of thermostatic mixing device is to: i) receive cold water; ii) receive hot water; and iii) regulate the flow rates of cold and hot water to provide a relatively constant temperature output. There are various applications for thermostatic devices and the vast majority of the mixing devices on the market utilise subtle variations of a traditional design. By way of example, typically a cylindrical piston moves up and down in a body, via a separate thermostatic element, in order to achieve a set point temperature of output flow.

The assembly of thermostatic mixing devices based on traditional designs is complex. Due to the complexity, the cost of thermostatic devices can be relatively high and an adherence to traditional designs has led to few economical improvements to those designs. That is, whilst adherence to traditional designs provides conventional comfort, development to offer a more commercially suitable product to customers has not been forthcoming. For example, mixing tubes may be included into mixing valves to, amongst other things, guide water as it mixes towards an outlet. Mixing tubes are included as a separate (plastic or metal) component into mixing valves. This design provides conventional comfort but it adds complexity as further manufacturing, processing and assembly steps are required. There is a standard preference to adopt this traditional design as new developments may have adverse consequences in a conventional industry. To this end, adherence to traditional designs have also led to other improvements, such as more compact designs, being overlooked whilst reconciling the trade-offs between cost, performance and reliability remains an ongoing engineering challenge.

Bearing this in mind, the present inventor(s) have developed an improved valve.

The aim of the present disclosure is to address the foregoing and other related, and unrelated, issues, or to at least provide a useful alternative.

SUMMARY

In one form, a valve is disclosed including:

a valve body having:

- at least two inlets; and
- an outlet configured to be in fluid communication with the at least two inlets;

an adjusting portion associated with the valve body, the adjusting portion providing a stop structure;

a piston in fluid communication with the at least two inlets and the outlet;

a thermostatic element configured to assist with moving the piston in response to engaging with the stop structure, the piston being configured to regulate fluid flow from the at least two inlets to the outlet;

a return spring configured to assist with biasing the thermostatic element; and a mixing part integrally formed with the valve body and configured to provide assistance with mixing fluid from the at least two inlets to the outlet.

In an embodiment, the return spring has a length that extends beyond one end of the mixing part.

In an embodiment, the mixing part forms a channel with the valve body to receive the return spring.

In an embodiment, the one end of the mixing part includes a free end.

In an embodiment, the mixing part is substantially within the return spring.

In an embodiment, the return spring extends beyond the one end of the mixing part in a direction towards the piston.

In an embodiment, the return spring extends beyond the mixing part in its direction of bias for the thermostatic element.

In an embodiment, a first end of the spring is located near the mixing part whilst a second end of the spring extends beyond the mixing part, towards the piston.

In an embodiment, the one end of the mixing part is at an opposite end to where the mixing part is connected to the valve body.

In an embodiment, the mixing part includes a tube portion.

In an embodiment, the tube portion extends from a connection with the valve body in a direction away from the outlet.

In an embodiment, the mixing part includes an inner wall and an outer wall.

In an embodiment, the outer wall assists in forming the channel with the valve body to receive the return spring.

In an embodiment, the inner wall assists in directing fluid towards the outlet.

In an embodiment, the mixing part encircles at least part of the thermostatic element.

In an embodiment, the inner wall faces the thermostatic element.

In an embodiment, a lower portion of the thermostatic element is located adjacent an end of the outlet.

In an embodiment, the lower portion of the thermostatic element substantially aligns with the end of the outlet.

In an embodiment, the piston has a height and a diameter and:

a ratio of the height to the diameter of the piston is in the range of 1:1.65 to 1:5; and/or.

a diameter of one of the at least two inlets is greater than the height of the piston.

In an embodiment, the ratio of the height to the diameter of the piston is in a range selected from: 1:1.65 to 1:5; 1:1.65 to 1:4.5; 1:1.65 to 1:3.5; 1:2 to 1:3; or 1:2.5 to 1:3.

In a further form, a method of manufacturing a valve is disclosed, the method including the steps of:

forming at least two inlets in a valve body;

forming an outlet in the valve body;

- forming a mixing part in the valve body, the mixing part configured to assist with mixing fluid from the at least two inlets to the outlet;

wherein the mixing part is integrally formed with the valve body.

In an embodiment, the step of forming the mixing part in the valve body includes leaving the mixing part integrally formed with the valve body.

In an embodiment, the step of forming the mixing part includes forming a channel in the valve body that is configured to receive a return spring and defines part of the mixing part.

In an embodiment, the method includes placing the return spring into the channel in a manner that allows its length to extend beyond one end of the mixing part.

In an embodiment, the method is herein as described.

In another form, a valve is disclosed including:

a valve body having:

at least two inlets; and an outlet configured to be in fluid communication with the at least two inlets;

an adjusting portion associated with the valve body, the adjusting portion providing a stop structure;

a piston in fluid communication with the at least two inlets and the outlet;

a thermostatic element configured to assist with moving the piston in response to engaging with the stop structure, the piston being configured to regulate fluid flow from the at least two inlets to the outlet; and a return spring configured to assist with biasing the thermostatic element, wherein:

a mixing part provides assistance with mixing fluid from the at least two inlets to the outlet; and the return spring has a length that extends beyond one end of the mixing part.

In an embodiment, the valve is herein as described.

In a further form, a method of manufacturing a valve is disclosed, the method including the steps of:

forming at least two inlets in a valve body;

forming an outlet in the valve body;

forming a channel in the valve body that is configured to receive a return spring and defines a mixing part; and placing the return spring into the channel in a manner that allows its length to extend beyond one end of the mixing part.

In an embodiment, the mixing part is integrally formed with the outlet.

In an embodiment, the return spring is placed into the channel in a manner that allows the return spring to surround the mixing part.

In an embodiment, the step of forming the channel in the valve body includes integrally forming the mixing part with the outlet.

In an embodiment, the method further includes inserting a thermostatic element into the mixing part. In an embodiment, the thermostatic element is connected to a piston.

In an embodiment, the method further includes placing at least part of a stop structure around at least part of the thermostatic element.

In an embodiment, the stop structure is provided as part of an adjusting portion.

In an embodiment, the piston includes a spring seat that receives a force from the return spring that is configured to bias the thermostatic element.

In another form, a valve is disclosed including:

a valve body having:

at least two inlets; and an outlet configured to be in fluid communication with the at least two inlets;

an adjusting portion associated with the valve body, the adjusting portion providing a stop structure;

a piston in fluid communication with the at least two inlets and the outlet, the piston having a spring seat;

a thermostatic element configured to assist with moving the piston in response to engaging with the stop structure, the piston being configured to regulate fluid flow from the at least two inlets to the outlet; and a return spring configured to assist with biasing the thermostatic element, wherein the return spring assists biasing the thermostatic element by providing a force to the spring seat of the piston.

In an embodiment, the spring seat extends transversely to an inner wall of the piston.

In an embodiment, the spring seat extends in a direction substantially perpendicular to a direction of travel of the return spring.

In an embodiment, the direction of travel of the return spring is parallel to a direction of travel for a shaft of the thermostatic element.

In an embodiment, the spring seat is located inboard from an end of the piston.

In an embodiment, the spring seat is located between the inner wall of the piston and an inner portion of the piston that receives the thermostatic element.

In an embodiment, a mixing part provides assistance with mixing fluid from the at least two inlets to the outlet.

In an embodiment, the mixing part forms a channel with the valve body to receive the return spring.

In an embodiment, the return spring is positioned between the lower portion of the channel and the spring seat to provide a force therebetween.

In an embodiment, the mixing part is fixed to the valve body.

In a different form, a method of regulating fluid in a valve is disclosed, the method including the steps of:

flowing fluid through at least two inlets;

channeling the fluid past outer facing walls of a piston;

adjusting the position of the piston to achieve a predetermined outlet temperature, the position of the piston being adjusted by and in response to a thermostatic element, wherein the piston includes a spring seat that receives a force from a return spring that is configured to bias the thermostatic element.

In an embodiment, the step of adjusting the position of the piston to achieve the predetermined outlet temperature includes adjusting an adjusting member.

In an embodiment, adjusting the adjusting member changes a force on a spring.

In an embodiment, the return spring directly engages with the spring seat as it passes an end of the piston.

In a further form, a valve is disclosed including:

a valve body having:

at least two inlets; and an outlet configured to be in fluid communication with the at least two inlets;

an adjusting portion associated with the valve body, the adjusting portion providing a stop structure;

a piston in fluid communication with the at least two inlets and the outlet, the piston having a height and a diameter;

a thermostatic element configured to assist with moving the piston in response to engaging with the stop structure, the piston being configured to regulate fluid flow from the at least two inlets to the outlet; and a return spring configured to assist with biasing the thermostatic element, wherein:

a ratio of the height to the diameter of the piston is in the range of 1:1.65 to 1:5; and/or a diameter of one of the at least two inlets is greater than the height of the piston.

In an embodiment, the at least two inlets include at least one of:

a connector inlet that is substantially circular; or a piston inlet that is substantially rectangular.

In an embodiment, the piston is configured to support the thermostatic element such that it extends into an aperture of the stop structure.

In an embodiment, the height of the piston is between 5 mm to 10 mm.

In an embodiment, the height of the piston is 8 mm.

In an embodiment, the height of the piston is less than 10 mm.

In a further form, a method of regulating fluid in a valve is disclosed, the method including the steps of:

flowing fluid through at least two inlets;

channeling the fluid past outer facing walls of a piston;

adjusting the position of the piston to achieve a predetermined outlet temperature, the position of the piston being adjusted by a thermostatic element, wherein a ratio of the height to the diameter of the piston is in the range of 1:1.65 to 1:15; and/or a diameter of one of the at least two inlets is greater than the height of the piston.

In an embodiment, an annulus is defined between the outer facing walls of the piston and hot and cold seats of the valve, and the fluid is channeled through the annulus.

In an embodiment, the step of flowing fluid through the at least two inlets includes channeling the fluid from a circular connector inlet to an annulus associated with the piston and one or more seats.

In an embodiment, the step of channeling the fluid past outer facing walls of the piston includes channeling the fluid past an outer facing wall height to a sealing portion height that is in the range of 1:1 to 1:5.

Further features and advantages of the present disclosure will become apparent from the following detailed description.

BRIEF DESCRIPTION OF THE DRAWINGS

By way of example only, embodiments of the present disclosure will be described more fully hereinafter with reference to the accompanying figures, wherein.

DETAILED DESCRIPTION

Figure 1:
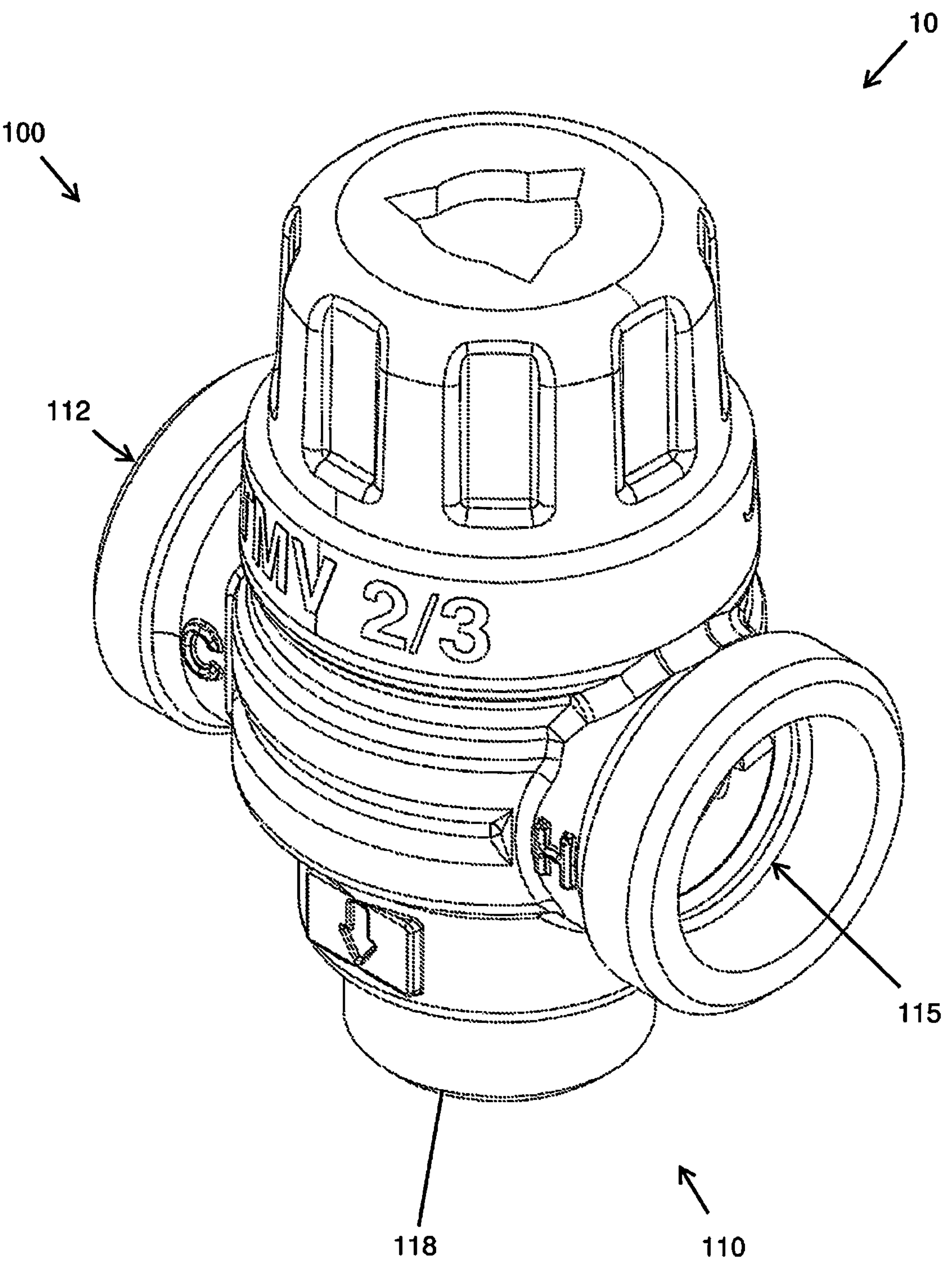
FIG. 1 illustrates a perspective view of a valve, according to an embodiment of the present disclosure.
Figure 2:
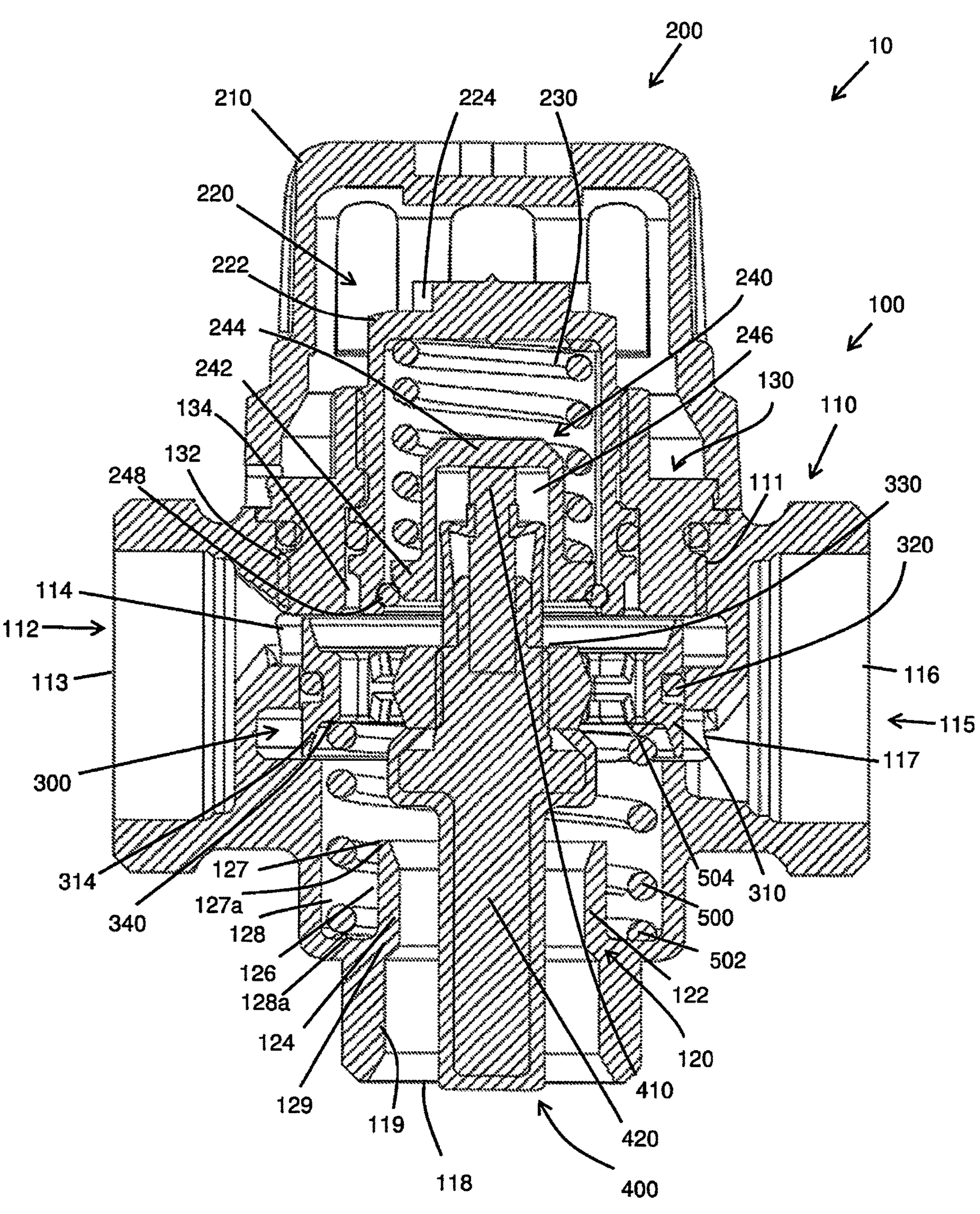
FIG. 2 illustrates a cross sectional view of the valve shown in FIG. 1.

FIGS. 1 and 2 illustrate a valve 10 according to an embodiment of the present disclosure. As shown further in FIG. 2, the valve 10 includes a valve body 100, an adjusting portion 200, a piston 300, a thermostatic element 400 and a return spring 500.

The valve body 100 includes a first body 110 and a second body 130. The first body 110 is further shown in FIG. 3. The first body 110 includes a cold inlet 112, a hot inlet 115 and an outlet 118. The cold inlet 112 and the hot inlet 115 respectively include a cold connector inlet 113 and a hot connector inlet 116. The connector inlets 113, 116 are substantially circular. The connector inlets 113, 116 are configured to fluidly connect with an adjacent conduit. The adjacent conduit typically has a similar flow diameter compared to the connector inlets 113, 116. The cold inlet 112 and the hot inlet 115 also respectively include a cold piston inlet 114 and a hot piston inlet 117. The piston inlets 114, 117 are substantially rectangular. The piston inlets 114, 117 provide an annulus between the piston 200 and respective hot and cold seats. In this regard, the inlets 112, 115 transition from a substantially circular shape to a rectangular shape. The piston inlets 114, 117 are located adjacent the piston 300.

The outlet 118 extends transversely to the inlets 112, 115. More specifically, the outlet 118 extends perpendicularly to the inlets 112, 115 in this embodiment. The outlet 118 includes outlet wall(s) 119 that are substantially circular. In a similar manner to the connector inlets 113, 116, the outlet wall(s) 119 are configured to be fluidly connected to an adjacent conduit. The outlet wall(s) 119 surround a lower portion of the thermostatic element 400. An end of the thermostatic element 400 substantially aligns with an end of the outlet 118; however, the end of the thermostatic element 400 can be offset in relation to the end of the outlet 118 without departing from the scope of the present disclosure. That is, in a direction across the valve 10, the end of the outlet wall(s) substantially align with an end of the thermostatic element 400.

The valve body 100 also includes a mixing part 120. The mixing part 120 is configured to provide assistance with mixing fluid from the inlets 112, 115 to the outlet 118. The mixing part 120 provides this assistance by (for example) channeling the mixed water more towards the thermostatic element 400. The closer contact of the mixed water and thermostatic element 400 provides more stability in controlling the outlet temperature of the valve 10.

According to the present disclosure, the mixing part 120 can be formed or otherwise incorporated with the valve body 100. In certain examples, as indicated in FIG. 2, the mixing part 120 is integrally formed with or otherwise fixed to the valve body 100. In one embodiment, the mixing part 120 is integrally machined formed into the first body 110 by a machining process, such as by machining or otherwise processing a forged brass billet or other suitable metallic material. In additional or alternative embodiments, the mixing part 120 may be (for example) casted or otherwise integrally formed within the valve body. Fixing the mixing part 120 to the valve body 100 provides a number of advantages including: i) reducing the cost of the valve 10; ii) avoiding complexity through additional parts; and iii) reducing material waste.

Figure 3:
FIG. 3 illustrates a cross sectional view of a body of the valve shown in FIG. 1.
Figure 3:
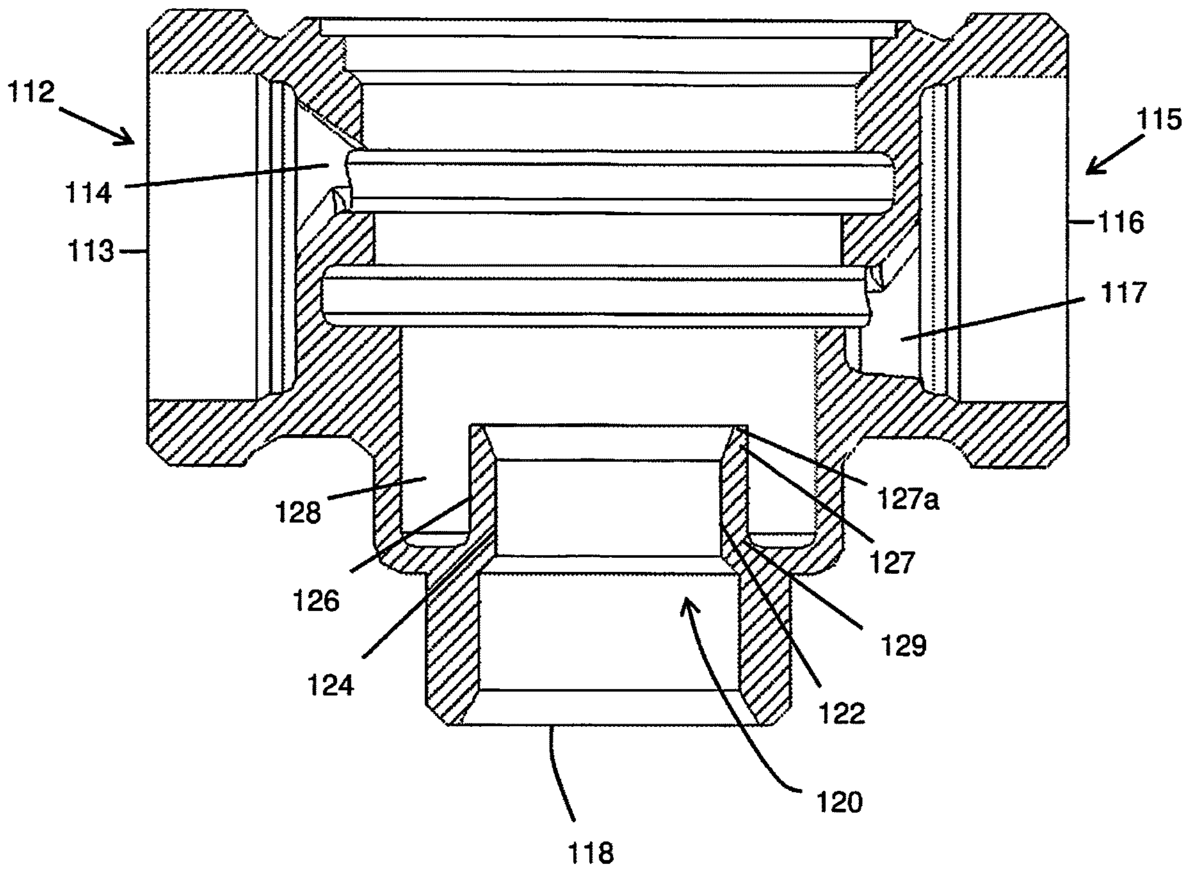
Figure 4:
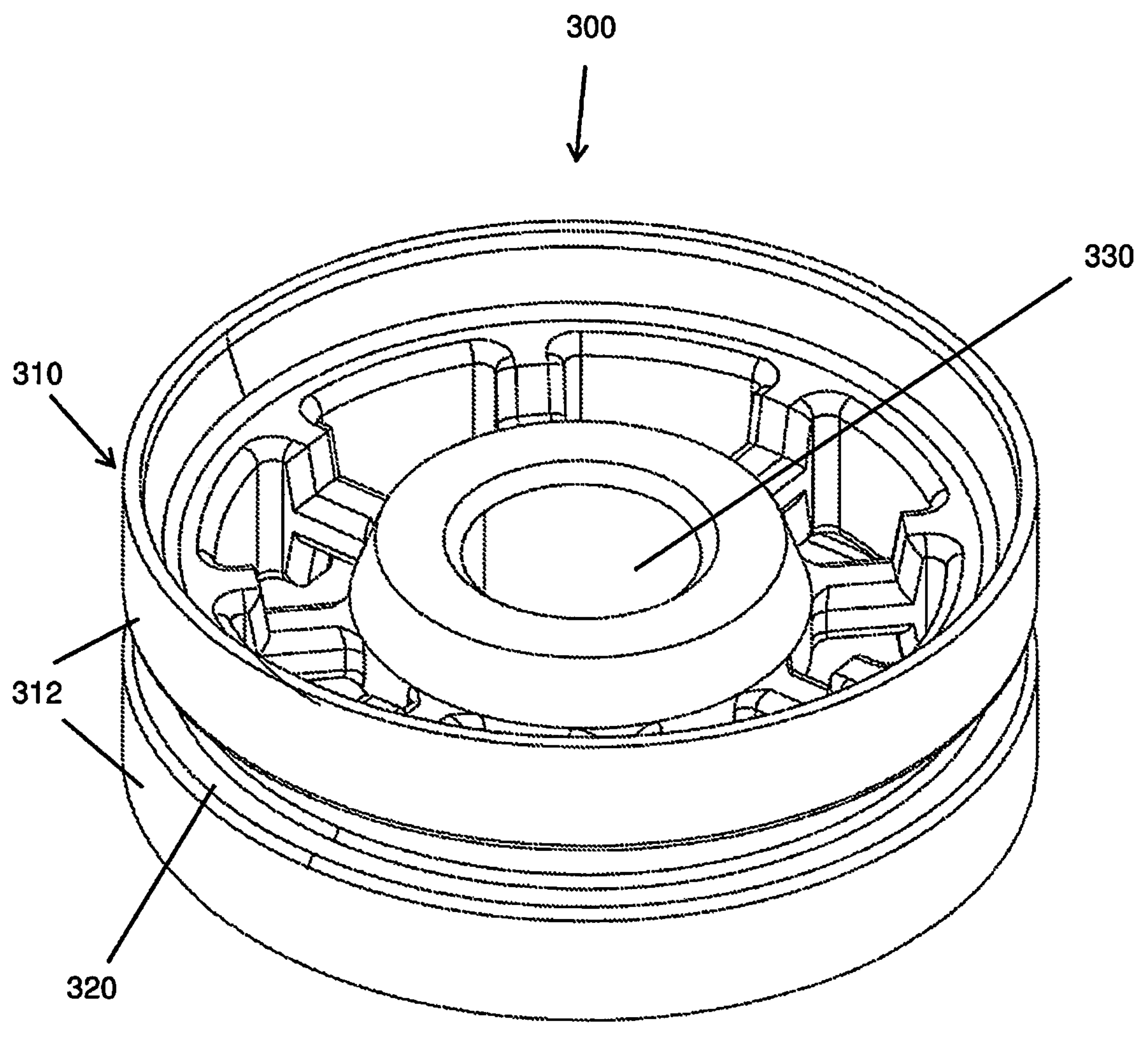
FIG. 4 illustrates a perspective view of a piston of the valve shown in FIG. 2.

As further indicated in FIGS. 2-4, the mixing part 120 includes a tube portion 122. The tube portion 122 connects to and extends from the outlet wall(s) 119 of the first body 110. In particular, from its connection with the outlet wall(s) 119, the tube portion 122 extends in a (opposite) direction away from the outlet 118. That is, the tube portion 122 extends towards the adjusting portion 200 from its connection with the outlet wall(s) 119. The tube portion 122 includes an inner wall 124 and an outer wall 126. The inner wall 124 and the outer wall 126 are substantially circular in this embodiment but may take other forms. The inner wall 124 connects to the outlet wall(s) 119. The inner wall 124 faces towards the thermostatic element 400 and assists in directing fluid towards the thermostatic element 400. In this regard, the mixing part 120 is located near (or adjacent) the thermostatic element 400. That is, the mixing part is located adjacent a (lower) portion 420 of the thermostatic element 400, the (lower) portion 420 being opposite to the shaft 410. The inner wall 124 includes a chamfer towards an end thereof.

The outer wall 126 is offset from part of the outer casing of the valve body 100. This results in the outer wall 126 forming at least a portion of a channel 128. The channel 128 is substantially circular, surrounding the tube portion 122 of the mixing part 102, as generally indicated in FIG. 4, though the channel 128 can take other forms without departing from the scope of the present disclosure. The channel 128 is configured to receive the return spring 500. The cross-sectional shape of the channel 128 is substantially U-shaped, though the channel 128 can have other, alternative shapes, e.g., square, etc. The outer wall 126 also includes one end 127 in the form of free end 127*a*. The free end 127*a* is not connected to another component and generally defines a cantilevered portion or section. The other end 129 of the mixing part 120 connects to the outlet wall(s) 119 (as indicated above). The channel 128 further forms or otherwise defines an engagement or spring bearing surface 128*a* that is configured to be contacted or otherwise engaged by an end portion of the spring 500. The end portion(s) of the spring 500 are ground flat to assist with engaging the spring bearing surface 128*a*.

The second body 130 assists in closing at least part of the first body 110. A connecting portion 111 of the first body 110 connects to a connecting portion 132 of the second body 130. For example, the first body 110 and the second body 130 are threadedly engaged. That is, the connecting portion 111 includes one or more threaded portions and the connecting portion 132 includes one or more threaded portions configured to mateably engage with each other. The second body 130 includes an aperture 134. The aperture 134 is configured to receive the adjusting portion 200 and connect thereto. In this regard, the second body 130 acts as an intermediary body between the first body 110 and the adjusting portion 200.

The adjusting portion 200 includes a cap 210, an adjusting member 220, a spring 230 and a stop structure 240. The cap 210 is configured to cover the adjusting member 220. The cap 210 is typically plastic. The cap 210 is configured to releasably engage with the second body 130 to allow it to connect to the valve 10. As detailed further below, the cap 210 is removed in order to adjust a set temperature of the valve 10, and then, the cap 210 is put back in place or otherwise returned after setting of the temperature. The cap 210 generally provides a tamperproof mechanism, e.g., that reduces, prevents, or inhibits unwanted access to the valve 10.

The adjusting member 220 includes a housing 222. The housing 222 includes an open end and a closed end. The housing 222 is substantially hollow. The housing 222 is connected to the second body 130. That is, the housing 222 is threadingly connected to the second body 130 to allow the housing 222 to move along the second body 130. The housing 222 also includes a driving portion 224 to assist with moving the housing 222. In response to rotating the driving portion 224, the housing 222 moves relative to the thermostatic element 400.

The spring 230 is retained in the housing 222. The spring 230 is positioned within the hollow of the housing 222 and abuts one end of the housing 222. The other end of the spring 230 is retained with the assistance of the stop structure 240. The spring 230 is a helical spring that encircles the stop structure 240. In this regard, the stop structure 240 extends partly through the spring 230.

The stop structure 240 is retained in the housing 222. The stop structure 240 includes a leg portion 242, a stop portion 244 and an aperture 246. The leg portion 242 extends from a side of the stop structure 240. The leg portion 242 engages with the spring 230 to assist in retaining the spring 230 in the housing 222. The spring 230 biases the stop structure 240 towards the thermostatic element 400.

The stop portion 244 is (axially) offset from leg portion 242. That is, the stop portion 244 is located, for example, closer to the driving portion 224 compared to the leg portion 242. Part of the aperture 246 is located between the leg portion 242 and the stop portion 244. The stop portion 244 is configured to engage with at least part of the thermostatic element 400. In operation, a shaft 410 of the thermostatic element 400 engages with the stop portion 244 to regulate the fluid temperature leaving the outlet 118.

The aperture 246 is configured to receive at least part of the thermostatic element 400. In this embodiment, approximately a quarter of the thermostatic element 400 is received into the aperture 246. This reduces the height of the valve 10, reducing the amount of material and cost associated with manufacturing the valve 10. The aperture 246 is substantially cylindrical and, in this regard, the stop structure 240 is shaped similar to a metal thimble.

An associated retaining portion 248 of the stop structure 240 assists in retaining the stop structure in the housing 222. The retaining portion 248 takes the form of a circlip. The retaining portion 248 engages with part of the leg portion 242 to prevent the stop structure 240 from releasing from the housing 222.

The piston 300 is shown further in FIG. 4. In one embodiment, the piston 300 is approximately 8 mm in height and approximately 27 mm in diameter, such that the height to diameter ratio is approximately 1:3.375. In another embodiment, the piston 300 is approximately 8 mm in height and approximately 30 mm in diameter, such that the height to diameter ratio is approximately 1:3.75. In embodiments, the piston can be approximately 5 mm to approximately 25 mm in height (such as approximately 5 mm to approximately 20 mm, approximately 5 mm to approximately 15 mm, approximately 5 mm to approximately 14 mm, approximately 5 mm to approximately 13 mm, approximately 5 mm to approximately 12 mm, approximately 5 mm to approximately 12 mm approximately, 5 mm to approximately 11 mm, approximately 5 mm to approximately 10 mm, approximately 5 mm to approximately 9 mm, approximately 5 mm to approximately 8.5 mm, approximately 5 mm to approximately 8 mm, approximately 5 mm to approximately 7.5 mm and integer and non-integer values therebetween). In addition, in embodiments, the piston 300 is approximately 20 mm to approximately 50 mm in diameter (such as approximately 20 mm to approximately 40 mm, approximately 20 mm to approximately 30 mm, approximately 30 mm to approximately 50 mm, approximately 30 mm to approximately 40 mm, approximately 40 mm to approximately 50 mm, approximately 25 mm to approximately 35 mm, approximately 25 mm to approximately 45 mm, etc. . . . ). Still further, in embodiments, the height to diameter ratio can be approximately 1:5, approximately 1:4, approximately 1:3, approximately 1:2, approximately 1:3.25, approximately 1:3.5, approximately 1:3.75, approximately 1:2.25, approximately 1:2.5, approximately 1:2.75, approximately 1:1.65, approximately 1:4.25, approximately 1:4.5, approximately 1:4.75. The height of the piston is such that it is smaller than the diameter of the connect inlets 113, 116.

These ratios and heights allow for a significant reduction in the amount of piston material, reducing the cost of the valve 10. Furthermore, the reduced heights of the piston 300 allow for a smaller valve body 100, reducing the amount of (brass) material required which leads to further advantages. These advantages have been achieved without a notable increase in pressure drop across the piston 300 compared to current valve designs. The smaller heights of the piston are possible due to the shape of the inlets 112, 115.

The piston includes an outer portion 310. The outer portion 310 includes two outer facing walls 312. The outer facing walls 312 are separated by a sealing portion 320. The height of the outer facing walls 312 can be kept to a suitable minimum that supports the sealing portion 320 and is able to regulate flow from the inlets 112, 115. The sealing portion 320 typically receives a seal in the form of an O-ring or other sealing member or portion.

The piston 300 also includes an inner portion 330. The inner portion 330 is configured to connect to the thermostatic element 400. This allows the piston 300 to move as a result of movement associated with the thermostatic element 400. Furthermore, the connection between the piston 300 and thermostatic element 400 positions the thermostatic element 400 at least partly through the aperture 246. The inner portion 330 is substantially circular.

The piston 300 further includes a spring seat 340. The spring seat 340 is configured to receive a force from the return spring 500. The spring seat 340 is located outboard of the inner portion 330 (and inboard of inner wall 314). The spring seat 340 is offset from an end of the piston 300. The spring seat 340 faces in a direction that is substantially perpendicular to the travel direction of the return spring 500. That is, the spring seat 340 extends laterally across the valve 10 between the inlets 112, 115. This positions the spring seat 340 in a manner that extends transversely to the outer walls 312. The return spring 500 directly engages with the spring seat 340 in this embodiment. In other words, they abut one another.

As noted above, the thermostatic element 400 includes a shaft 410. The shaft 410 is configured to move based on the temperature surrounding the thermostatic element 400. To set a predetermined outlet temperature of the valve 10, the adjusting member 220 of the adjusting portion 200 is moved to a particular location after removing the cap 210. That is, the housing 222 is shifted along the second body 130 to set an initial distance between the stop portion 244 and the shaft 410 of the thermostatic element 400. As the shaft 410 interacts with the stop portion 244, it regulates the mixing of hot and cold water to achieve the predetermined outlet temperature (as detailed further below).

The return spring 500 is a coil spring. The return spring 500 includes a first end 502 and a second end 504. As noted above, the return spring 500 is received into the channel 128. This positions the first end 502 in the bottom of the channel 500. The channel 500 assists in retaining the return spring 500, particularly in a direction towards its centre. The return spring 500 extends beyond the mixing part 120 in its length direction. Accordingly, at least part of the return spring 500 is located outboard of the free end **127*a* of the mixing part 120. The return spring 500 extends towards the piston 300 such that the second end 504 engages with the spring seat 340. The return spring 500 encircles the mixing part 120, inboard of its outer diameter. In other words, the mixing part 120 is located within the body of the return spring 500. This non-obvious, simplified arrangement provides a number of advantages, including reducing the complexity of the mixing part 120**.

During operation of the valve 10, cold and hot water respectively enters through the inlets 112, 115. The hot and cold water is channeled along the connector inlets 113, 116 towards the piston inlets 114, 117. The hot and cold water passes around the piston 300 and respectively travels over the ends of the piston 300 towards the thermostatic element 400. As the cold and hot water travels towards the outlet 118, and along the thermostatic element 400, it mixes to assist in achieving the predetermined outlet temperature. The mixing part 120 assists in channeling the mixing hot and cold water towards the thermostatic element 400.

In the event that the mixed water is not achieving the predetermined outlet temperature, the thermostatic element 400 will suitably react to adjust the location of the piston 300 and the ratio of hot to cold water passing the piston 300. For example, in response to the mixed outlet water being above the predetermined outlet temperature, the shaft 410 will further extend through the aperture 246 to press against the stop portion 244. As a result, the thermostatic element 400 will shift in the opposite direction which in turn will adjust the position of the piston 300, closing the distance between the piston 300 and an associated hot seat. This reduces the amount of hot water passing over an end of the piston 300, which in turn reduces the temperature of the mixed water leaving the outlet 118. In this regard, it will also be appreciated that as piston 300 moves towards the hot seat, the return spring 500 is compressed between the spring seat 340 and a lower portion of the channel 128. Similarly, in response to mixed outlet water being too cold, the shaft 410 will retract allowing further hot water and less cold water to pass the end of the piston 300. This in turn will raise the temperature of the mixed outlet water. The return spring 500 directly acting on the spring seat 340 allows the piston 300 to move towards a cold seat to limit the amount of cold water passing the piston 300.

As indicated above, the valve 10 offers a number of advantages without any notable reduction in the performance of current valve designs. The mixing part 120 reduces the number of components required in the valve 10 and provides non-obvious cost and design benefits. The valve 10 also significantly reduces the amount of brass material used in the construction of the valve 10, providing further cost, design and environmental benefits. The design of the piston 300 also reduces the amount of a high-value engineering polymer required, again adding to the advantages of the valve 10.

In this specification, adjectives such as left and right, top and bottom, hot and cold, first and second, and the like may be used to distinguish one element or action from another element or action without necessarily requiring or implying any actual such relationship or order. Where context permits, reference to a component, an integer or step (or the alike) is not to be construed as being limited to only one of that component, integer, or step, but rather could be one or more of that component, integer or step.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The above description relating to embodiments of the present disclosure is provided for purposes of description to one of ordinary skill in the related art. It is not intended to be exhaustive or to limit the disclosure to a single disclosed embodiment. As mentioned above, numerous alternatives and variations to the present disclosure will be apparent to those skilled in the art from the above teaching. Accordingly, while some alternative embodiments have been discussed specifically, other embodiments will be apparent or relatively easily developed by those of ordinary skill in the art. The present disclosure is intended to embrace all modifications, alternatives, and variations that have been discussed herein, and other embodiments that fall within the spirit and scope of the above description.

Item List:

| Item No | Item |
|---|---|
| 10 | Valve |
| 100 | Valve Body |
| 110 | First Body |
| 111 | Connecting portion |
| 112 | Cold Inlet |
| 113 | Cold connector inlet |
| 114 | Cold piston inlet |
| 115 | Hot Inlet |
| 116 | Hot connector inlet |
| 117 | Hot piston inlet |
| 118 | Outlet |
| 119 | Outlet wall(s) |
| 120 | Mixing part |
| 122 | Tube portion |
| 124 | Inner wall |
| 126 | Outer wall |
| 127 | One end |
| 127a | Free end |
| 128 | Channel |
| 128a | Spring bearing surface |
| 130 | Second body |
| 132 | Connecting portion |
| 134 | Aperture |
| 200 | Adjusting portion |
| 210 | Cap |
| 220 | Adjusting member |
| 222 | Housing |
| 224 | Driving portion |
| 230 | Spring |
| 240 | Stop structure |
| 242 | Leg portion |
| 244 | Stop portion |
| 246 | Aperture |
| 248 | Retaining portion |
| 300 | Piston |
| 310 | Outer portion |
| 312 | Outer facing walls |
| 314 | Inner wall |
| 320 | Sealing portion |
| 330 | Inner portion |
| 340 | Spring seat |
| 400 | Thermostatic element |
| 410 | Shaft |
| 420 | Lower portion |
| 500 | Return spring |
| 502 | First end |
| 504 | Second end |

The invention claimed is:

1. A valve including:

a valve body having:

at least two inlets; and an outlet configured to be in fluid communication with the at least two inlets;

an adjusting portion associated with the valve body, the adjusting portion providing a stop structure;

a piston in fluid communication with the at least two inlets and the outlet;

a thermostatic element configured to assist with moving the piston in response to engaging with the stop structure, the piston being configured to regulate fluid flow from the at least two inlets to the outlet; and a return spring configured to assist with biasing the thermostatic element; and a mixing part provides assistance with mixing fluid from the at least two inlets to the outlet, wherein the mixing part is integrally formed with valve body; and the at least two inlets transition from a substantially circular shape to a substantially rectangular shape.

2. The valve of claim 1, wherein the return spring has a length that extends beyond one end of the mixing part.

3. The valve of claim 1, wherein the mixing part forms a channel with the valve body to receive the return spring.

4. The valve of claim 1, wherein one end of the mixing part is in the form of a free end.

5. The valve of claim 4, wherein the free end is at an opposite end to where the mixing part is connected to the valve body.

6. The valve of claim 1, wherein the mixing part includes a tube portion that extends from a connection with the valve body in a direction away from the outlet.

7. The valve of claim 1, wherein a ratio of piston height to piston diameter is in the range of 1:1.65 to 1:5.

8. The valve of claim 1, wherein a diameter of one of the at least two inlets is greater than the piston height.

9. The valve of claim 1, wherein the piston includes a spring seat that receives a force from the return spring that is configured to assist in biasing the thermostatic element.

10. The valve of claim 1, wherein one of the at least two inlets is a cold inlet and another of the at least two inlets is a hot inlet such that the cold inlet is aligned along an axis with the hot inlet, the axis extending across the piston.

11. A method of manufacturing a valve, the method including the steps of:

forming at least two inlets in a valve body;

forming an outlet in the valve body; and forming a mixing part in the valve body, the mixing part configured to assist with mixing fluid from the at least two inlets to the outlet;

wherein the mixing part is integrally formed with the valve body; and wherein the at least two inlets transition from a substantially circular shape to a substantially rectangular shape.

12. The method of claim 11, wherein the step of forming the mixing part includes forming a channel in the valve body that is configured to receive a return spring and defines part of the mixing part.

13. The method of claim 12, wherein the method includes placing the return spring into the channel in a manner that allows its length to extend beyond one end of the mixing part.

14. The method of claim 11, wherein the method further includes inserting a thermostatic element into the mixing part.

15. The method of claim 11, wherein one of the at least two inlets is a cold inlet and another of the at least two inlets is a hot inlet such that the cold inlet is aligned along an axis with the hot inlet, the axis extending across the piston.

* * * * *